United States Patent
Lin et al.

(10) Patent No.: US 10,122,691 B2
(45) Date of Patent: Nov. 6, 2018

(54) RECEIVING APPARATUS AND PACKET PROCESSING METHOD THEREOF

(71) Applicant: REALTEK SEMICONDUCTOR CORP., Hsinchu (TW)

(72) Inventors: Chia-Hung Lin, New Taipei (TW);
Chang-Shiuan Yang, Taichung (TW);
Yi-Huei Lei, Kaohsiung (TW);
Chun-Hao Lin, Taoyuan (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 197 days.

(21) Appl. No.: 15/203,445

(22) Filed: Jul. 6, 2016

(65) Prior Publication Data
US 2017/0180329 A1    Jun. 22, 2017

(30) Foreign Application Priority Data

Dec. 18, 2015 (TW) .............................. 104142667 A

(51) Int. Cl.
| | |
|---|---|
| G06F 11/00 | (2006.01) |
| H04L 29/06 | (2006.01) |
| G06F 11/10 | (2006.01) |
| G06F 12/14 | (2006.01) |

(52) U.S. Cl.
CPC ...... *H04L 63/0428* (2013.01); *G06F 11/1004* (2013.01); *G06F 12/1408* (2013.01); *H04L 63/0435* (2013.01); *H04L 69/12* (2013.01); *H04L 69/164* (2013.01); *H04L 69/22* (2013.01);
(Continued)

(58) Field of Classification Search
CPC .................................................. H04L 63/0428
See application file for complete search history.

(56) References Cited

U.S. PATENT DOCUMENTS

| | | | |
|---|---|---|---|
| 7,620,071 B2 | 11/2009 | Makineni et al. | |
| 9,479,464 B1* | 10/2016 | Wang | ...................... H04L 69/22 |
| 2015/0288663 A1* | 10/2015 | Watanabe | ........... H04L 63/0428 |
| | | | 380/28 |

OTHER PUBLICATIONS

Webstie Title IETF Tools Article Titile QUIC: A UDP-Based Secure and Reliable URL https://tools.ietf.org/html/draft-tsvwg-quic-protocol-01 Date Jul. 8, 2015 Writer Hamilton et al (Year: 2015).*

* cited by examiner

*Primary Examiner* — Alexander Lagor
*Assistant Examiner* — Syed M Ahsan
(74) *Attorney, Agent, or Firm* — Li & Cai Intellectual Property (USA) Office

(57) ABSTRACT

The present disclosure provides a receiving apparatus for preprocessing at least one segment data packet to a data packet. The receiving apparatus includes a packet parser, a data memory, a decrypt engine, a transmission engine, a header processing unit and a controller. The packet parser fetches segment-packet-header information from a segment packet header of each segment data packet. The decrypt engine decrypts an encrypted data of each segment data packet to obtain a segment payload and a QUIC private header including sequence information. The transmission engine transmits the segment payload to a specific location of a system memory. The header processing unit calculates packet information and updates the segment packet header stored in the data memory to generate a packet header. The controller controls the transmission engine based on the sequence information to output the packet header to the system memory for generating the data packet.

19 Claims, 7 Drawing Sheets

(52) U.S. Cl.
CPC ...... *H04L 69/26* (2013.01); *G06F 2212/1052* (2013.01)

RECEIVING APPARATUS AND PACKET PROCESSING METHOD THEREOF

BACKGROUND

1. Technical Field

The present disclosure relates to a receiving apparatus, in particular, to a receiving apparatus supporting a QUIC (Quick UDP Internet Connection) protocol, and a packet processing method thereof

2. Description of Related Art

The QUIC protocol is a low latency transport layer protocol based on a UDP protocol. A communication apparatus which supports the QUIC protocol receives at least one segment data packet, and stores the segment data packet in a system memory of the communication apparatus. The communication apparatus decrypts each segment data packet to obtain a payload recorded in the segment data packet.

The current communication apparatus decrypts the segment data packet using a central processing unit (CPU) installed in the communication apparatus. The central processing unit decrypts each segment data packet, which causes a utilization rate of the central processing unit to increase. Furthermore, the current communication apparatus stores a header of the segment data packet in a system memory installed in the communication apparatus, such that the system memory cannot store other data.

SUMMARY

An exemplary embodiment of the present disclosure provides a receiving apparatus. The receiving apparatus is configured to receive at least one segment data packet, and to preprocess at least one segment data packet to a data packet. The receiving apparatus includes a packet parser, a data memory, a decrypt engine, a transmission engine, a header processing unit and a controller. The packet parser fetches at least one set of segment-packet-header information from a segment packet header of the at least one segment data packet. The data memory stores the at least one segment packet header. The decrypt engine selectively decrypts an encrypted data of each segment data packet to obtain at least one QUIC private header and at least one segment payload. Each QUIC private header includes sequence information of the corresponding segment data packet. The transmission engine transmits the at least one segment payload to at least one specific location of a system memory. The header processing unit calculates packet information based upon the at least one QUIC private header, and updates the at least one segment packet header stored in the data memory to generate a packet header. The controller controls the transmission engine based on the sequence information to output the packet header to the system memory for generating the data packet by combining the packet header with the at least one segment payload.

An exemplary embodiment of the present disclosure provides a packet processing method. The packet processing method is adapted for a receiving apparatus, wherein the receiving apparatus is configured to receive at least one segment data packet, and to preprocess at least one segment data packet to a data packet. The packet processing method comprises the following steps. Step A: receiving at least one segment data packet, and fetching at least one set of segment-packet-header information from a segment packet header of the at least one segment data packet. Step B: storing the at least one segment packet header in a data memory of the receiving apparatus. Step C: selectively decrypting an encrypted data of each segment data packet to obtain at least one QUIC private header and at least one segment payload. Each QUIC private header includes sequence information of the corresponding segment data packet. Step D: transmitting the at least one segment payload to the at least one specific location of a system memory. Step E: calculating packet information based upon the at least one QUIC private header, and updating the at least one segment packet header stored in the data memory to generate a packet header. Step F: outputting the packet header to the system memory based on the sequence information to generate the data packet by combining the packet header with the at least one segment payload.

To sum up, the receiving apparatus and the packet processing method of the present disclosure can decrypt the segment data packet through the receiving apparatus, and preprocess at least one segment data packet to a data packet. Workload of the central processing unit of the communication apparatus is reduced by installing the receiving apparatus of the present disclosure, and the utilization rate of the central processing unit is decreased.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
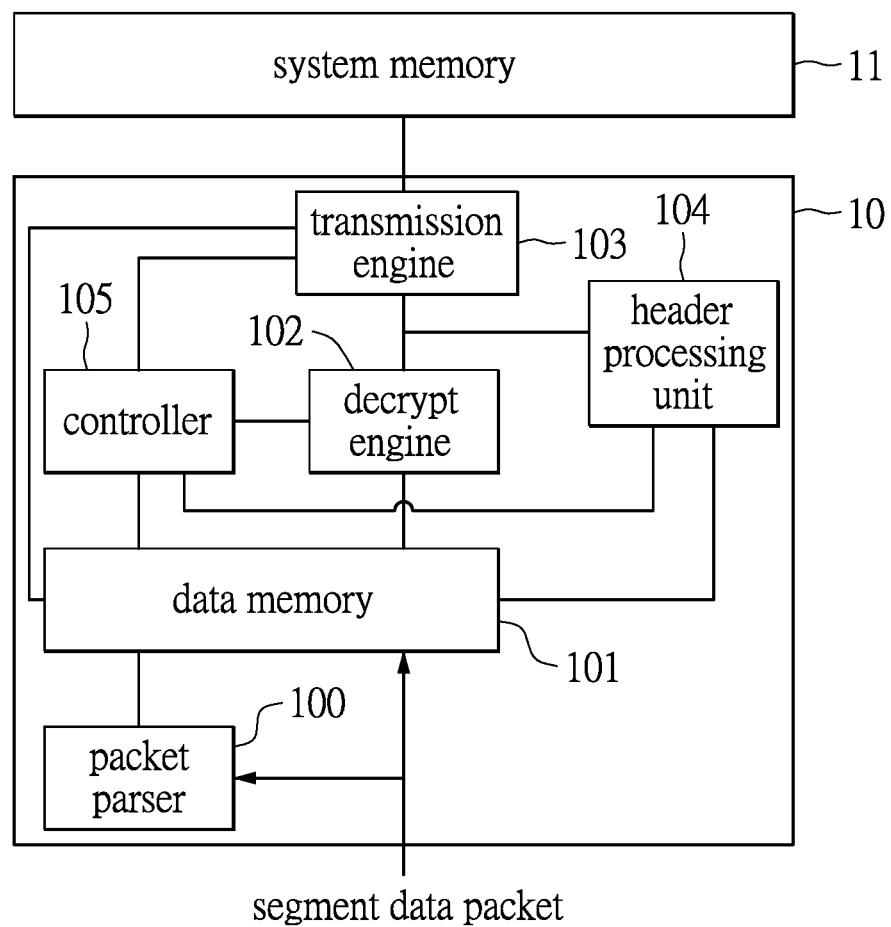
FIG. 1 is a block diagram illustrating a receiving apparatus according to an embodiment.

Referring to FIG. 1, FIG. 1 is a block diagram illustrating a receiving apparatus according to an embodiment. The receiving apparatus 10 includes a packet parser 100, a data memory 101, a decrypt engine 102, a transmission engine 103, a header processing unit 104 and a controller 105. The data memory 101 is coupled to the packet parser 100, the decrypt engine 102, the transmission engine 103, the header processing unit 104 and the controller 105. The decrypt engine 102 is coupled to the transmission engine 103, the header processing unit 104 and the controller 105. The transmission engine 103 is coupled to the controller 105 and a system memory 11. The header processing unit 104 is coupled to the controller 105.

The receiving apparatus 10 can be installed in a general communication apparatus, such as a computer or a smart phone which can support a QUIC (Quick UDP Internet Connection) protocol. The receiving apparatus 10 is configured to receive at least one segment data packet, and then preprocess the segment data packet to a data packet. The system memory 11 is installed in the communication apparatus described above. The system memory 11 is configured to store the data packet outputted from the receiving apparatus 10.

Figure 2:
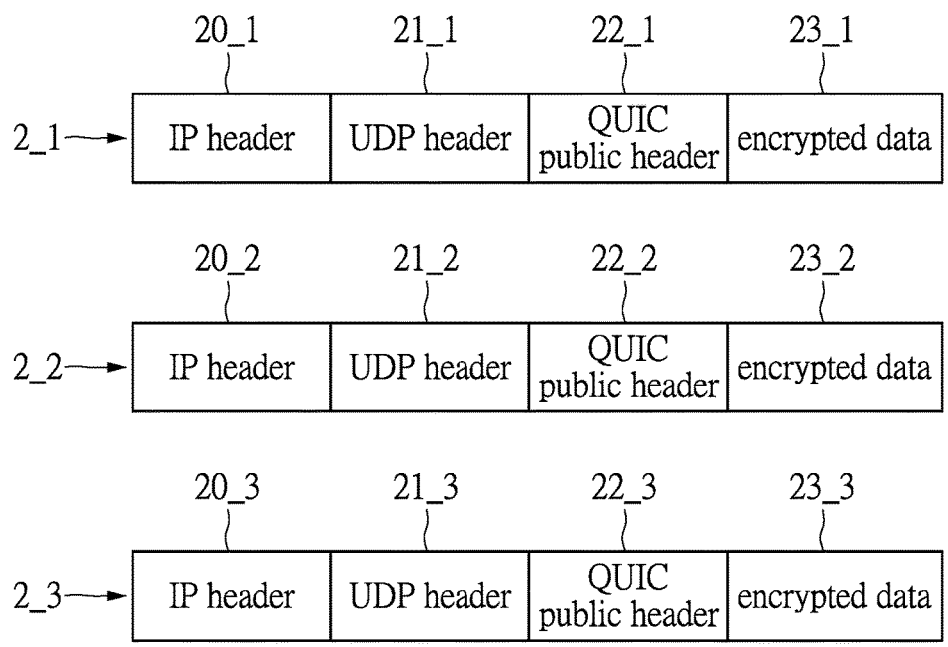
FIG. 2 is a schematic diagram illustrating segment data packets according to an embodiment.

Referring to FIG. 2 in conjunction with FIG. 1, FIG. 2 is a schematic diagram illustrating segment data packets according to an embodiment. Each segment data packet includes an IP header, an UDP header, a QUIC public header and an encrypted data. Each of the IP header, the UDP header and the QUIC public header includes information which is needed during a packet transmission process, such as the packet size, a source address, a destination address or a transport protocol. The encrypted data includes encrypted information which the communication device actually transfers.

The packet parser 100 is configured to fetch a segment packet header from each segment data packet. The packet parser 100 analyzes the segment packet header to obtain at least one segment-packet-header information, and stores the segment-packet-header information in the data memory 101. The segment-packet-header information includes at least one of a packet type, the destination address and a cyclic redundancy check (CRC) code.

In some embodiments, the packet parser 100 further determines whether the received segment data packet is a QUIC packet or not based upon the segment-packet-header information. For example, the packet parser 100 determines whether the received segment data packet is the QUIC packet based upon the packet type recorded in the segment-packet-header information. If the segment data packet is the QUIC packet, the data memory 101 stores the segment-packet-header information. If the segment data packet is not the QUIC packet (e.g., a TCP packet), the segment data packet is outputted to the system memory 11 through the transmission engine 103. Or, the segment data packet is outputted to another circuit (not shown) of the receiving apparatus 10, and the another circuit processes the segment data packet.

In some embodiments, the packet parser 100 further determines whether the segment data packet is transported to a correct destination according to the destination address. Or, the packet parser 100 further determines whether the segment data packet is correctly transported according to the CRC code. Accordingly, the packet parser 100 decides whether to discard or delete the corresponding segment data packet.

The data memory 101, e.g., any kind of storage media, is configured to receive the segment data packet and the segment-packet-header information outputted by the packet parser 100. In some embodiments, the data memory 101 stores the segment data packet and the segment-packet-header information in the same storage block.

The decrypt engine 102 is configured to selectively decrypt the encrypted data of each segment data packet to obtain a QUIC private header and a segment payload. For example, if the segment data packet is the QUIC packet, the decrypt engine 102 decrypts the encrypted data based on an Advanced Encryption Standard (AES) or a Salsa20 Standard. Then, the decrypt engine 102 outputs the QUIC private header to the header processing unit 104, and outputs the segment payload to the transmission engine 103. Moreover, the decrypt engine 102 can obtain sequence information of the segment data packet according to the QUIC private header and then output the sequence information to the controller 105.

Figure 3:
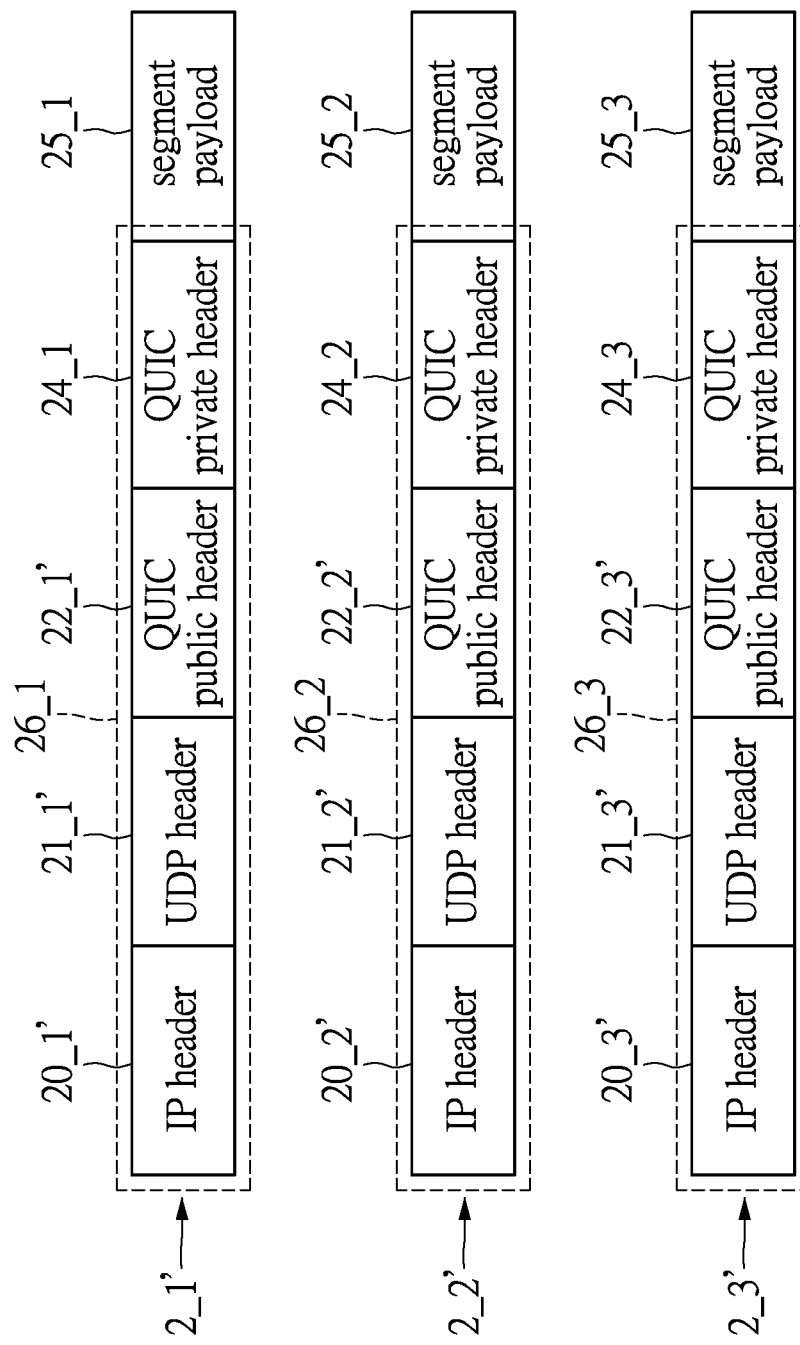
FIG. 3 is a schematic diagram illustrating decrypted segment data packets according to an embodiment.

Referring to FIG. 3 in conjunction with FIG. 2, FIG. 3 is a schematic diagram illustrating decrypted segment data packets according to an embodiment. The decrypt engine 102 decrypts the encrypted data 23_1 to obtain the QUIC private header 24_1 and the segment payload 25_1, such that the segment data packet shown in FIG. 2 can be seen as the segment data packet shown in FIG. 3. For example, the header processing unit 104 respectively updates the IP header 20_1, the UDP header 21_1 and the QUIC public header 22_1 to obtain the IP header 20_1', the UDP header 21_1' and the QUIC public header 22_1'. The IP header 20_1', the UDP header 21_1', the QUIC public header 22_1' and the QUIC private header 24_1 of the segment data packet 2_1' are defined as the segment packet header 26_1. Details about updating the IP header 20_1, the UDP header 21_1 and the QUIC public header 22_1 are described below.

Similarly, the decrypt engine 102 decrypts the encrypted data 23_2 and 23_3, such that the segment data packets 2_2 and 2_3 shown in FIG. 2 can be seen as the segment data packets 2_2' and 2_3' shown in FIG. 3.

The transmission engine 103 outputs the segment payload to a specific location in the system memory 11 based on the command outputted by the controller 105. In some embodiments, if the segment data packet is not the QUIC packet, the transmission engine 103 directly outputs the segment data packet to the system memory 11.

In some embodiments, the decrypt engine 102 writes the decrypted segment payload back to the data memory 101. After the receiving apparatus 10 finishes preprocessing the segment data packet to the data packet, the receiving apparatus 10 outputs the complete data packet to the system memory 11.

The header processing unit 104 is configured to update the segment packet header stored in the data memory 101 based upon the QUIC private header. In more details, the header processing unit 104 calculates packet information based upon the QUIC private header and the original IP header, the UDP header and the QUIC public header stored in the data memory 101, wherein the packet information includes at least one of an IP checksum, an UDP checksum, a packet length, a segment payload length and a byte offset. The header processing unit 104 overwrites the calculated packet information to corresponding locations of the data memory 101. Furthermore, the header processing unit 104 writes the QUIC private header back to the data memory 101 for updating the segment packet header. Notably, after finishing updating the segment packet header stored in the data memory 101, i.e., there is no following segment data packet stored in the data memory 101, the updated segment packet header can be seen as a packet header. In another embodiment, the updated segment packet header can be seen as the packet header from the segment packet header updated over a period of time. Or, the updated segment packet header can be seen as the packet header if the segment packet header is updated over a preset number of times.

The controller 105, such as a microcontroller, is configured to receive the packet information calculated by the header processing unit 104 and the sequence information (such as a packet index) outputted by the decrypt engine 102, and then to control the transmission engine 103 based on the sequence information to output the packet header and at least one segment payload to the system memory 11. The details about controlling other elements by the controller 105 are described in FIGS. 4A-4B and the following paragraph.

The system memory 11, such as any kind of storage media, is configured to store the packet header and at least one segment payload.

Figure 4A:
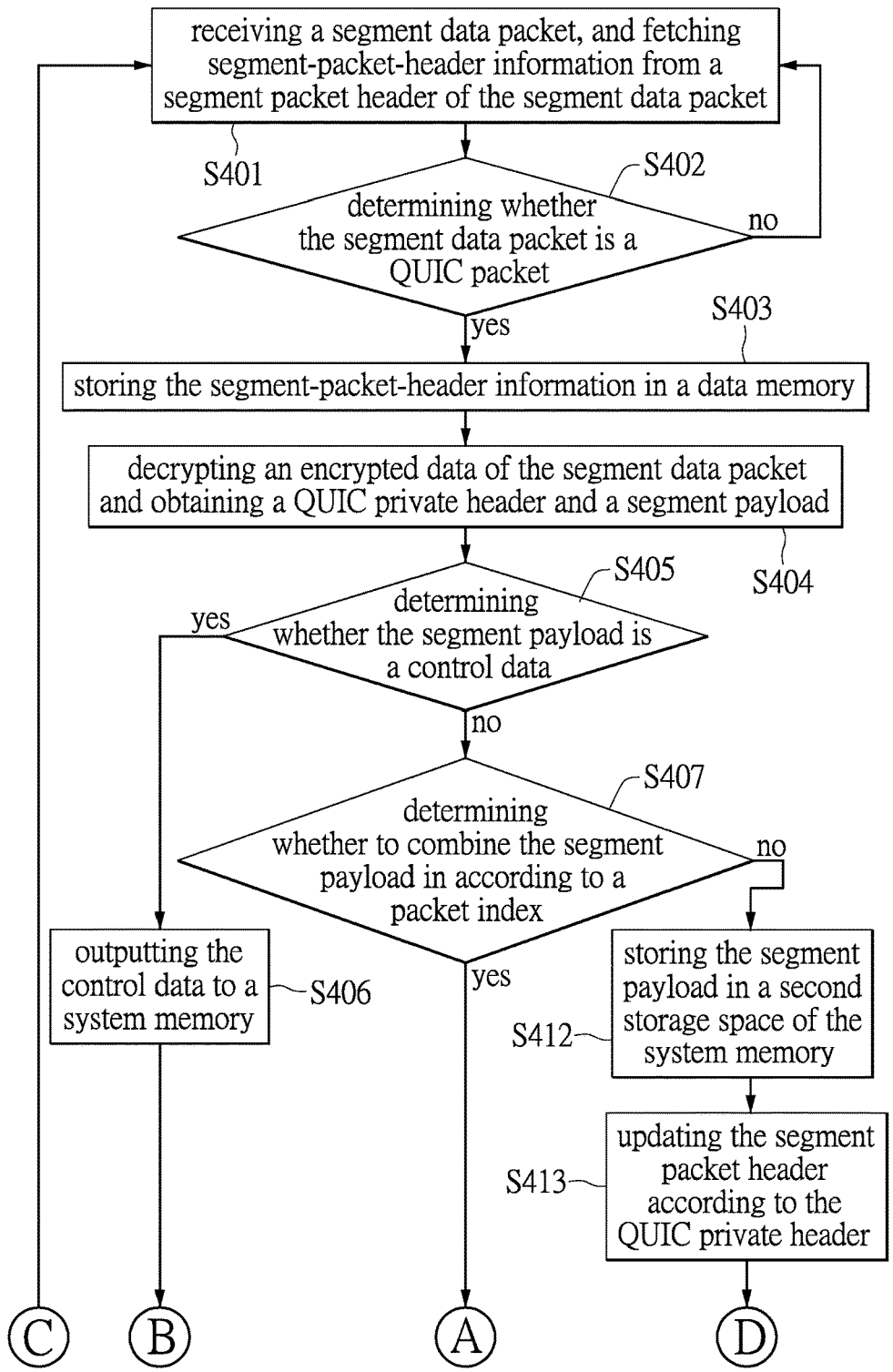
FIGS. 4A-4B are flow charts illustrating a packet processing method according to an embodiment.
Figure 4B:
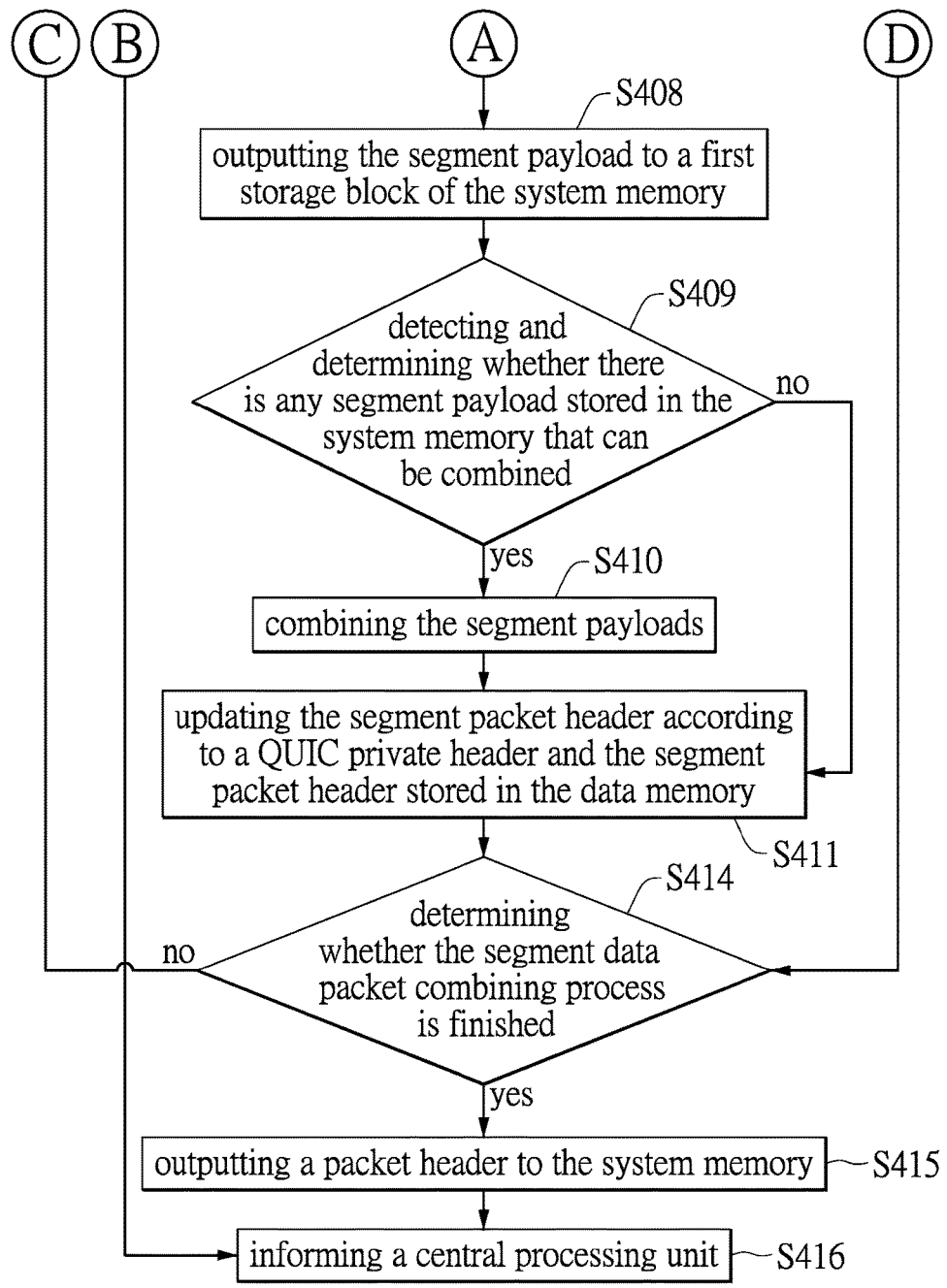

Referring to FIGS. 4A-4B, FIG. 4A-4B are flow charts illustrating a packet processing method according to an embodiment. The packet processing method can be adapted for the receiving apparatus 10 shown in FIG. 1.

In step S401, a packet parser 100 and a data memory 101 receive a segment data packet. The packet parser 100 fetches segment-packet-header information from a segment packet header of the segment data packet.

In step S402, the packet parser 100 determines whether the segment data packet is a QUIC packet in response to the segment-packet-header information. If the segment data packet is the QUIC packet, step S403 is executed. If the segment data packet is not the QUIC packet, the segment data packet is outputted to the system memory 11 through the transmission engine 103, and the method goes to step S401.

In step S403, the data memory 101 stores the segment-packet-header information.

In step S404, the decrypt engine 102 decrypts an encrypted data of the segment data packet to obtain a QUIC private header and a segment payload. The decrypt engine 102 outputs the QUIC private header and the segment payload to a header processing unit 104 and the transmission engine 103 respectively.

In step S405, a controller 105 determines whether the segment payload is a control data. The control data may be a command outputted from another communication apparatus to control the receiving apparatus 10 performing a specific action. If the segment payload is the control data, step S406 is executed. If the segment payload is not the control data, step S407 is executed.

In step S406, the transmission engine 103 outputs the control data to the system memory 11. The header processing unit 104 updates the segment packet header stored in the data memory 101 based on the QUIC private header. Then, the transmission engine 103 outputs the updated segment packet header to the system memory 11.

In step S407, the controller 105 determines whether to combine the current segment payload and the other segment payload stored in the system memory 11 according to a packet index. If the controller 105 determines the current segment payload and the other segment payload can be combined, referring to FIG. 4B, step S408 is executed.

As shown in FIG. 4B, in step S408, the controller 105 controls the transmission engine 103 to sequentially output the segment payload to a first storage block of the system memory 11, in which the first storage block stores another segment payload, and the another segment payload's packet index and the current segment payload's packet index are continuous.

In step S409, the controller 105 determines whether there is any segment payload stored in the system memory 11 that can be combined. If there is at least one segment payload that can be combined with the current segment payload outputted by the transmission engine 103, step S410 is executed. If there is no segment payload that can be combined with the current segment payload, step S411 is executed.

In step S410, the controller 105 combines the segment payloads stored in the system memory 11 through the transmission engine 103.

In step S411, the header processing unit 104 updates the segment packet header stored in the data memory 101 according to the QUIC private header.

Returning to step S407, if the controller 105 determines the current segment payload cannot be combined with the other segment payload stored in the system memory 11, step S412 is executed.

In step S412, the controller 105 controls the transmission engine 103 to store the segment payload in a second storage block of the system memory 11, wherein the second storage block does not store any data or packet.

In step S413, the header processing unit 104 calculates at least one of an IP checksum, a UDP checksum, a packet length, a segment payload length and a byte offset based on the QUIC private header, and updates the corresponding segment packet header stored in the data memory 101.

In step S414, the controller 105 determines whether the segment data packet combining process is finished. If yes, step S415 is executed. If not, the method goes to step S401 as shown in FIG. 4A.

In some embodiments, the controller 105 determines that the segment data packet combining process is finished if the controller 105 detects that the segment packet header comprises an end bit. Since only the last segment packet header comprises the end bit, the controller 105 determines whether the last segment packet header is received according to the end bit. In some embodiments, since the segment data packet comprising the end bit may not be the last segment data packet which the receiving apparatus 10 receives, the controller 105 determines that the segment data packet combining process is finished if the controller 105 detects the segment packet header comprising the end bit, and all segment packet headers stored in the data memory 101 have been combined. Or, the controller 105 determines that the segment data packet combining process is finished if the controller 105 detects the segment packet header comprising the end bit, and all segment payloads stored in the system memory 11 have been combined.

In some embodiments, the controller 105 uses a timer to calculate an interval between receiving two segment data packets for determining whether the segment data packet combining process is going to finish. Or, the controller 105 uses a counter to calculate how many segment data packets are received for determining whether the segment data packet combining process is finished. For instance, after receiving a segment data packet, if the receiving apparatus 10 does not receive a next segment data packet within a preset time, the controller 105 determines the segment data packet combining process is finished. On the contrary, if the receiving apparatus 10 does receive the next segment data packet within the preset time, the controller 105 continues executing the segment data packet combining process.

In step S415 as shown in FIG. 4B, the transmission engine 103 outputs a packet header (i.e., a combined segment packet header) to the system memory 11, such that the controller 105 combines the packet header and a payload (i.e., a combined segment payload) to generate a data packet. In step S416, the controller 105 informs communication apparatus comprising the receiving apparatus 10 that the packet processing method is finished.

Figure 5A:
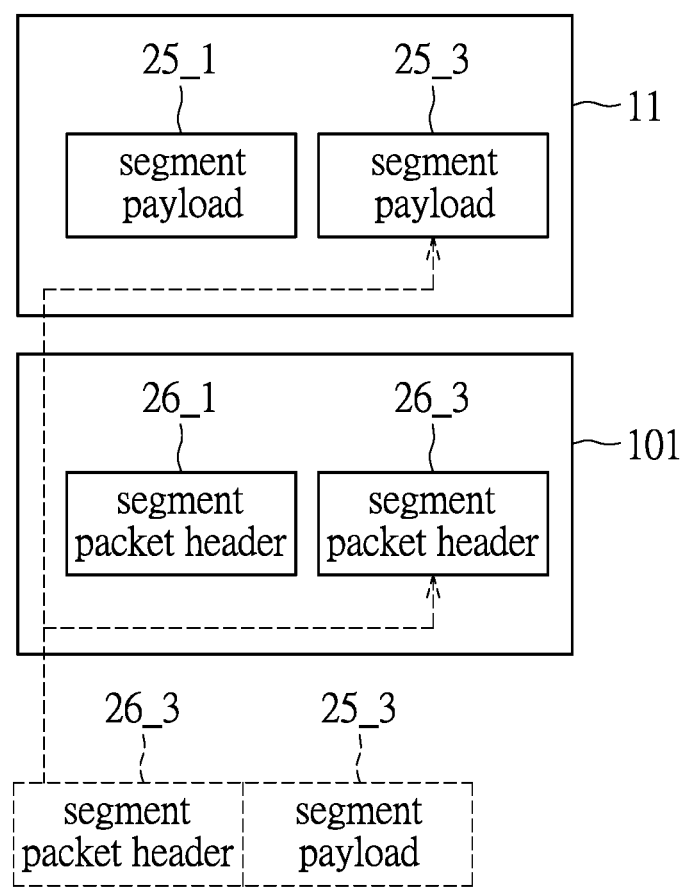
FIGS. 5A-5B are schematic diagrams illustrating a process for processing segment data packets according to an embodiment.
Figure 5B:
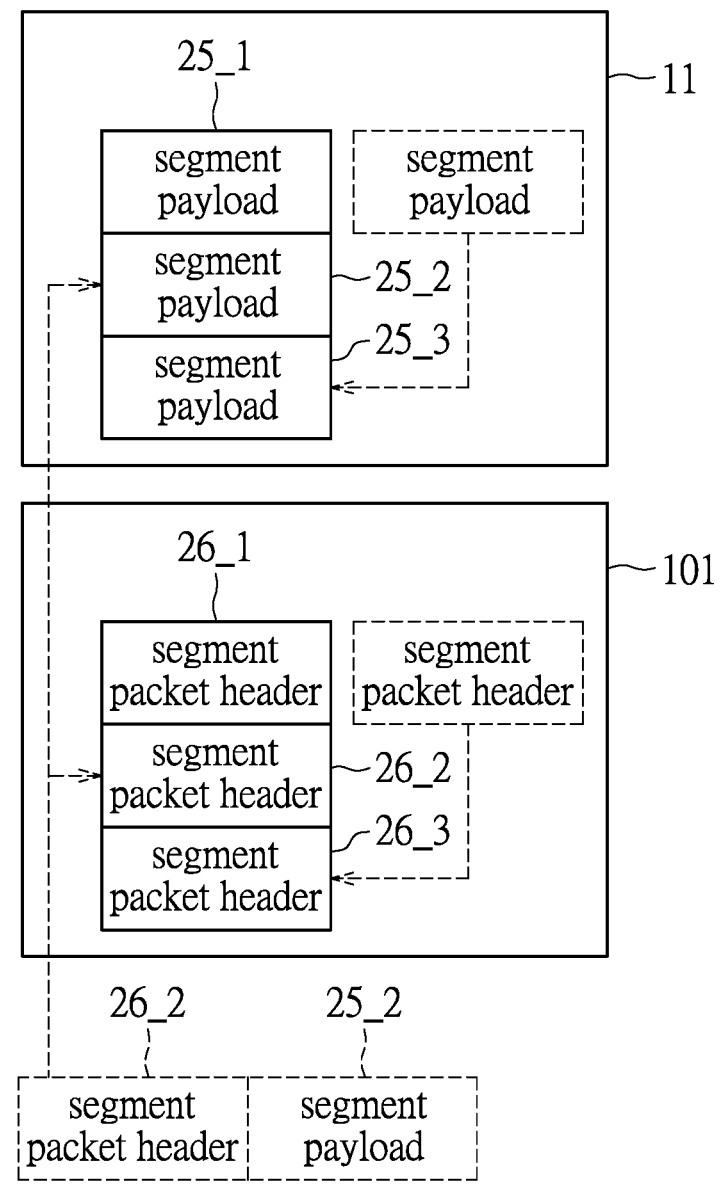

For example, referring to FIGS. 5A-5B, FIGS. 5A-5B are schematic diagrams illustrating a process for processing segment data packets according to an embodiment. Notably, FIGS. 5A-5B only show the system memory 11 and the data memory 101 for illustrating how the receiving apparatus 10 shown in FIG. 1 processes the three segment data packets 2_1, 2_2 and 2_3 shown in FIG. 2. In the embodiment, the receiving apparatus 10 sequentially receives the segment data packets 2_1, 2_3 and 2_2. Segment payloads of the three segment data packets 2_1, 2_2 and 2_3 are not control data.

First, the receiving apparatus 10 receives the segment data packet 2_1 and processes the segment data packet 2_1 based on step S401-S404 shown in FIG. 4A to generate the QUIC private header 24_1 and the segment payload 25_1 shown in FIG. 3. Since the segment payload 25_1 is not the control data, and the segment payload 25_1 is the first received segment payload, the receiving apparatus 10 processes the segment payload 25_1 based on step S405, S407, S412 and S413, such that the segment payload 25_1 and the segment packet header 26_1 are stored in the system memory 11 and the data memory 101 respectively. In step S414, since the segment packet header 26_1 does not include the end bit, the controller 105 continues executing the segment data packet combining process.

Next, the receiving apparatus 10 receives the segment data packet 2_3, and processes the segment data packet 2_3 based on steps S401-S404 shown in FIG. 4A to generate the QUIC private header 24_3 and the segment payload 25_3 shown in FIG. 3. As shown in FIG. 5A, since the segment payload 25_3 is not the control data, and the segment data packets 2_1 and 2_3 are not continuous segment data packets (i.e., the packet indices of the segment data packets 2_1 and 2_3 are discontinuous), the receiving apparatus 10 processes the segment payload 25_3 based on the step S405, S407, S412 and S413, such that the segment payload 25_3 is stored in another storage block of the system memory 11. On the other hand, the segment packet header 26_3 is stored in another storage block of the data memory 101. In step S414, the segment packet header 26_3 includes the end bit, but both of the system memory 11 and the data memory 101 store discrete data. Hence, the controller 105 continues executing the segment data packet combining process.

Then, the receiving apparatus 10 receives the segment data packet 2_2, and processes the segment data packet 2_2 based on step S401-S404 shown in FIG. 4A to generate the QUIC private header 24_2 and the segment payload 25_2 shown in FIG. 3. As shown in FIG. 5B, since the segment payload 25_2 is not the control data, and the segment data packets 2_1 and 2_2 are continuous segment data packets (i.e., the packet indices of the segment data packets 2_1 and 2_2 are continuous), the receiving apparatus 10 processes the segment payloads 25_1 and 25_2 based on step S405, S407 and S408 to combine the segment payloads 25_1 and 25_2. In step S409, since the system memory 11 includes another continuous segment payload 25_3, the receiving apparatus 10 combines the segment payload 25_3 with the segment payloads 25_1 and 25_2, and step S411 is executed to combine the segment packet headers 26_1, 26_2 and 26_3. The combined packet header and the segment packet header 26_1 have the same packet length.

Finally, in step S414, since the combined packet header (including the information of the segment packet header 26_3) includes the end bit, and both of the system memory 11 and the data memory 101 do not store any discrete data, the controller 105 determines that the segment data packet combining process is finished. The controller 105 controls the transmission engine 103 to output the combined packet header to the system memory 11 for generating a data packet, and informs communication apparatus comprising the receiving apparatus 10 that the packet processing method is ended.

In summary, the receiving apparatus and the packet processing method of the present disclosure can decrypt the segment data packet through the receiving apparatus, and preprocess at least one segment data packet to a data packet. Workload of the central processing unit of the communication apparatus is reduced installing the receiving apparatus of the present disclosure, and then the utilization rate of the central processing unit is decreased.

Furthermore, the segment packet headers are stored in the data memory of the receiving apparatus, such that storage capacity of the system memory is not occupied to store the segment packet header of each segment data packet. Hence, the system memory can release more storage capacity to store other information, and thus the system memory can be used more effectively.

What is claimed is:

1. A receiving apparatus, configured to receive at least one segment data packet, and to preprocess at least one segment data packet to a data packet, comprising:
   a packet parser, configured to fetch at least one set of segment-packet-header information from a segment packet header of the at least one segment data packet, wherein the at least one segment data packet is a QUIC packet according to the corresponding segment-packet-header information;
   a data memory, configured to store the at least one segment packet header;
   a decrypt engine, configured to selectively decrypt an encrypted data of each segment data packet to obtain at least one QUIC private header and at least one segment payload, wherein each QUIC private header includes sequence information of the corresponding segment data packet;
   a transmission engine, configured to transmit the at least one segment payload to at least one specific location of a system memory;
   a header processing unit, configured to calculate packet information based upon the at least one QUIC private header, and to update the at least one segment packet header stored in the data memory to generate a packet header; and
   a controller, configured to control the transmission engine based on the sequence information to output the packet header to the system memory for generating the data packet by combining the packet header with the at least one segment payload.

2. The receiving apparatus according to claim 1, wherein the segment-packet-header information comprises at least one of a packet type, a destination address and a cyclic redundancy check (CRC) code.

3. The receiving apparatus according to claim 1, wherein the data memory stores the corresponding segment-packet-header information, and the decrypt engine decrypts the encrypted data of the one of the at least one segment data packet.

4. The receiving apparatus according to claim 1, wherein the controller determines whether to combine the at least one segment payload according to a packet index recorded in each sequence information; if the packet indices of a first segment data packet and a second segment data packet of the segment data packets are discontinuous, the controller controls the transmission engine to store a first segment payload of the first segment data packet and a second segment payload of the second segment data packet to different storage blocks of the system memory.

5. The receiving apparatus according to claim 4, wherein if the packet indices of the first segment data packet and the second segment data packet are discontinuous, the controller controls the data memory to store a first segment packet header of the first segment data packet and a second segment packet header of the second segment data packet to different storage blocks of the data memory.

6. The receiving apparatus according to claim 1, wherein the controller determines whether to combine at least one segment payload in according to a packet index recorded in each sequence information; if the packet indices of a first segment data packet and a second segment data packet of the segment data packets are continuous, the controller controls the transmission engine to combine a first segment payload of the first segment data packet and a second segment payload of the second segment data packet, and the transmission engine stores the combined payload to a storage block of the system memory.

7. The receiving apparatus according to claim 6, wherein if the packet indices of the first segment data packet and the second segment data packet are continuous, the controller combines a first segment packet header of the first segment data packet and a second segment packet header of the second segment data packet, and stores the combined packet header in a storage block of the data memory.

8. The receiving apparatus according to claim 1, wherein the header processing unit writes the at least one QUIC private header and the packet information back to the data memory to update the corresponding segment packet header stored in the data memory, wherein each packet information comprises at least one of a checksum, a packet length, a segment payload length and a byte offset.

9. The receiving apparatus according to claim 1, wherein if the controller detects the at least one segment packet header comprises an end bit, or if the controller detects the at least one segment packet header comprises the end bit and all segment packet headers stored in the data memory are combined, or if the controller detects at least one segment packet header comprising the end bit and all segment payloads stored in the system memory are combined, the controller controls the transmission engine to output the combined packet header stored in the data memory to the system memory.

10. The receiving apparatus according to claim 1, wherein after receiving the at least one segment data packet, if the receiving apparatus does not receive a next segment data packet within a preset time, the controller controls the transmission engine to output the packet header stored in the data memory to the system memory.

11. A packet processing method, adapted for a receiving apparatus, wherein the receiving apparatus is configured to receive at least one segment data packet, and to preprocess at least one segment data packet to a data packet, and the packet processing method comprises:
    step A: receiving at least one segment data packet, and fetching at least one set of segment-packet-header information from a segment packet header of the at least one segment data packet;
    step B: storing the at least one segment packet header in a data memory of the receiving apparatus;
    step C: selectively decrypting an encrypted data of each segment data packet to obtain at least one QUIC private header and at least one segment payload, wherein each QUIC private header includes sequence information of the corresponding segment data packet;
    step D: transmitting the at least one segment payload to the at least one specific location of a system memory;
    step E: calculating packet information based upon the at least one QUIC private header, and updating the at least one segment packet header stored in the data memory to generate a packet header; and
    step F: outputting the packet header to the system memory based on the sequence information to generate the data packet by combining the packet header with the at least one segment payload,
    wherein the step A further comprises the following steps:
        step A-1: determining whether one of the at least one segment data packet is a QUIC packet according to the corresponding segment-packet-header information; and
        step A-2: if the one of the at least one segment data packet is the QUIC packet, storing the corresponding segment-packet-header information, and decrypting the encrypted data of the one of the at least one segment data packet.

12. The packet processing method according to claim 11, wherein the segment-packet-header information comprises at least one of a packet type, a destination address and a cyclic redundancy check (CRC) code.

13. The packet processing method according to claim 11, wherein the step D further comprises the following steps:
    step D-1: determining whether to combine the at least one segment payload according to a packet index recorded in each sequence information; and
    step D-2: if the packet indices of a first segment data packet and a second segment data packet of the segment data packets are discontinuous, controlling the transmission engine to store a first segment payload of the first segment data packet and a second segment payload of the second segment data packet to different storage blocks of the system memory.

14. The packet processing method according to claim 13, wherein the step D further comprises the following steps:
    step D-3: if the packet indices of the first segment data packet and the second segment data packet are discontinuous, controlling the data memory to store a first segment packet header of the first segment data packet and a second segment packet header of the second segment data packet in different storage blocks of the data memory.

15. The packet processing method according to claim 11, wherein the step D further comprises the following steps:
    step D-1': determining whether to combine at least one segment payload according to a packet index recorded in each sequence information; and
    step D-2': if the packet indices of a first segment data packet and a second segment data packet of the segment data packets are continuous, controlling the transmission engine to combine a first segment payload of the first segment data packet and a second segment payload of the second segment data packet, and storing the combined payload to a storage block of the system memory.

16. The packet processing method according to claim 15, wherein the step D further comprises the following steps:
    step D-3': if the packet indices of the first segment data packet and the second segment data packet are continuous, combining a first segment packet header of the first segment data packet and a second segment packet header of the second segment data packet, and storing the combined packet header in a storage block of the data memory.

17. The packet processing method according to claim 11, wherein the step E further comprises the following steps:
    step E-1: writing the at least one QUIC private header and the packet information back to the data memory to update the corresponding segment packet header stored in the data memory, wherein each packet information comprises at least one of a checksum, a packet length, a segment payload length and a byte offset.

18. The packet processing method according to claim 11, wherein the step F further comprises the following steps:

step F-1: if detecting the at least one segment packet header comprises an end bit, or if detecting the at least one segment packet header comprises the end bit and all segment packet headers stored in the data memory are combined, or if detecting the at least one segment packet header comprises the end bit and all segment payloads stored in the system memory are combined, controlling the transmission engine to output the combined packet header stored in the data memory to the system memory.

19. The packet processing method according to claim 11, wherein the step F further comprises the following steps:
step F-1': after receiving the at least one segment data packet, if the receiving apparatus does not receive a next segment data packet within a preset time, controlling the transmission engine to output the packet header stored in the data memory to the system memory.

* * * * *